(12) United States Patent
Lorentz et al.

(10) Patent No.: US 9,102,312 B2
(45) Date of Patent: Aug. 11, 2015

(54) SYSTEM FOR CONTROLLING A TRANSMISSION

(71) Applicant: Caterpillar Inc., Peoria, IL (US)

(72) Inventors: Timothy A. Lorentz, Morton, IL (US); Hoon Lee, Savoy, IL (US); Brent G. Drews, Washington, IL (US)

(73) Assignee: Caterpillar Inc., Peoria, IL (US)

( * ) Notice: Subject to any disclaimer, the term of this patent is extended or adjusted under 35 U.S.C. 154(b) by 76 days.

(21) Appl. No.: 13/913,125

(22) Filed: Jun. 7, 2013

(65) Prior Publication Data

US 2014/0364274 A1    Dec. 11, 2014

(51) Int. Cl.
*F16H 61/00*   (2006.01)
*B60W 10/02*   (2006.01)
*B60W 10/10*   (2012.01)

(52) U.S. Cl.
CPC .............. *B60W 10/02* (2013.01); *B60W 10/10* (2013.01); *Y10T 477/6425* (2015.01)

(58) Field of Classification Search
CPC .............................. B60W 10/02; B60W 10/10
USPC ..................................... 477/143, 166; 701/53
See application file for complete search history.

(56) References Cited

U.S. PATENT DOCUMENTS

| 4,989,470 | A | | 2/1991 | Bulgrien |
| 5,029,494 | A | | 7/1991 | Lentz et al. |
| 5,070,747 | A | | 12/1991 | Lentz et al. |
| 5,072,390 | A | | 12/1991 | Lentz et al. |
| 7,267,634 | B2 | * | 9/2007 | Nakagawa et al. ........... 477/175 |
| 8,113,989 | B2 | * | 2/2012 | MacFarlane et al. ......... 477/144 |
| 8,298,118 | B2 | * | 10/2012 | Kim et al. ...................... 477/15 |
| 8,452,499 | B2 | | 5/2013 | Lorentz et al. |
| 2007/0113694 | A1 | * | 5/2007 | Shizume ........................ 74/335 |
| 2012/0316738 | A1 | * | 12/2012 | Teslak et al. .................... 701/53 |
| 2013/0054098 | A1 | * | 2/2013 | Lorentz et al. ................. 701/53 |
| 2013/0054099 | A1 | * | 2/2013 | Lorentz et al. ................. 701/53 |

OTHER PUBLICATIONS

Route et al., "Ratio Changing the Passenger Car Automatic Transmission," Society of Automotive Engineers, Jan. 9-13, 1961, 45 pp.

* cited by examiner

*Primary Examiner* — David J Hlavka
(74) *Attorney, Agent, or Firm* — Leydig, Voit & Mayer, Ltd.

(57) ABSTRACT

A system for shifting a transmission includes an off-going clutch, an on-coming clutch, and an assisting clutch. A controller is configured to increase an amount of torque carried by each of the on-coming clutch and the assisting clutch. The controller is further configured to reduce an amount of torque carried by the off-going clutch and, after the off-going clutch is disengaged, to reduce the amount of torque carried by the assisting clutch.

20 Claims, 5 Drawing Sheets

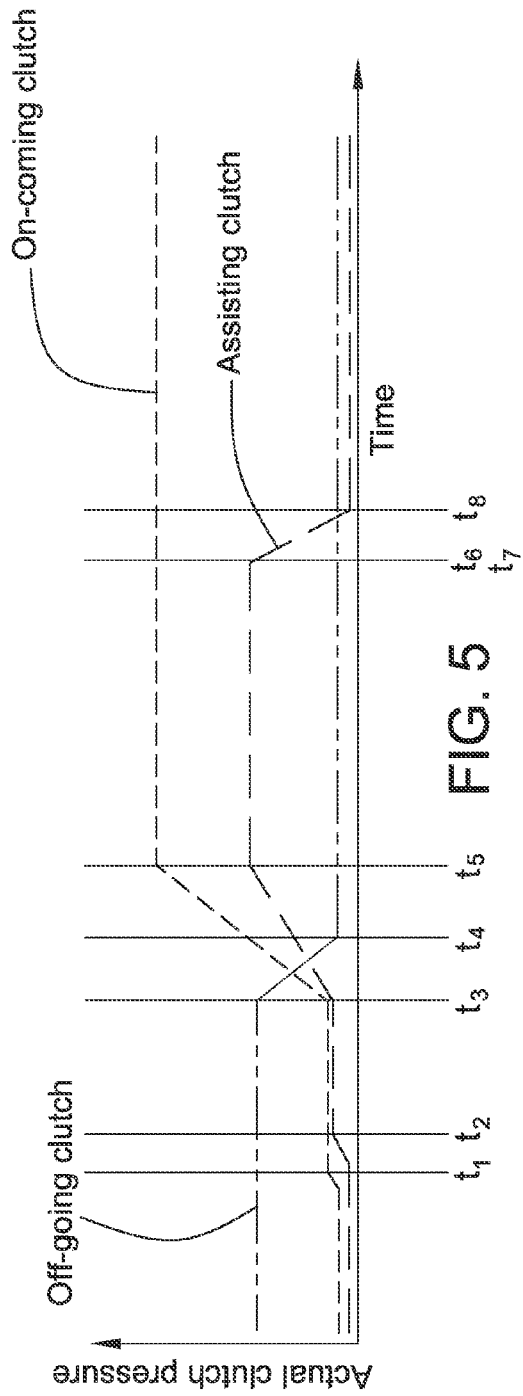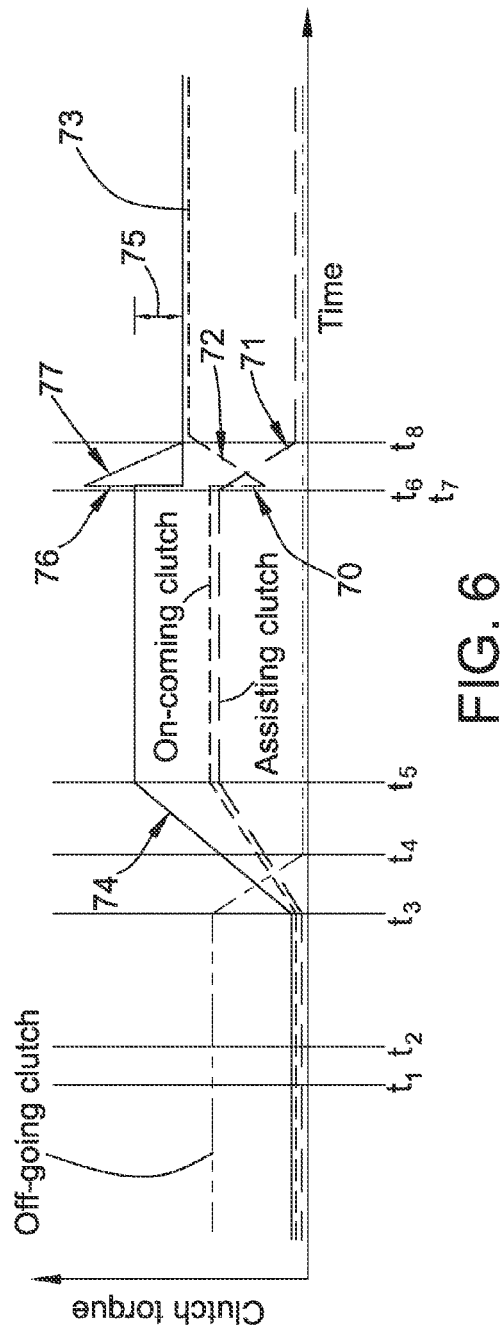

SYSTEM FOR CONTROLLING A TRANSMISSION

TECHNICAL FIELD

This disclosure relates generally to a system for controlling a transmission of a machine and, more particularly, to a system for controlling the transmission during a shifting operation to share torque and/or distribute clutch wear within the transmission.

BACKGROUND

Transmission systems use a number of different transmission configurations and control schemes. The transmissions typically include a plurality of intermeshing gears that are either fixed to transmission shafts or that rotate freely on the shafts. Clutches associated with the freely rotating gears may be selectively engaged to establish a series of speed ratios between a prime mover output shaft and a transmission output shaft to transmit torque at a desired speed to drive a machine. Control systems for controlling the clutches typically respond to operator controls such as those directing the speed of the machine. The control system may send electrical signals to hydraulic valves that control the clutches. The control system thus causes the clutches to engage and disengage in predetermined combinations to accelerate, decelerate, and drive a machine as desired by the operator.

In a typical speed shifting operation, a first clutch (often referred to as an off-going clutch) is disengaged while a second clutch (often referred to as an on-coming clutch) is engaged. In doing so, the torque carried by the off-going clutch is transferred to the on-coming clutch to complete the shifting operation. To avoid or minimize interruptions in the transfer of torque from the input shaft to the output shaft during the shifting operation, the torque may be shared between the off-going clutch and the on-coming clutch as the shifting operation occurs. Due to the inertia of rotating components, the on-coming clutch must be capable of carrying a greater amount of torque during an upshift speed shifting operation as compared to that carried after the shift is completed. As a result, the on-coming clutch must be sized to accommodate the increase in torque that must be carried during the upshifting operation. However, since each of the clutches may be used as the on-coming clutch in some shifting operation, each of the clutches are typically configured to carry a larger load or amount of torque than they will likely carry after the shifting operation is completed.

In directional or shuttle shifting operations, a clutch may be used to slow a machine before changing directions. U.S. Pat. No. 4,989,470 discloses a system that permits controlled deceleration of a vehicle during directional shifts by disengaging the transmission from the engine through the disengagement of one of the clutches within the transmission. A different clutch is then engaged to create braking or tie-up within the transmission to create a load on the vehicle and slow the rotation of the transmission and the velocity of the vehicle. Once the vehicle has reached a desired velocity, typically close to zero, the clutch used for braking is disengaged and another clutch engaged for accelerating the vehicle in the desired direction.

The foregoing background discussion is intended solely to aid the reader. It is not intended to limit the innovations described herein nor to limit or expand the prior art discussed. Thus the foregoing discussion should not be taken to indicate that any particular element of a prior system is unsuitable for use with the innovations described herein, nor is it intended to indicate any element, including solving the motivating problem, to be essential in implementing the innovations described herein. The implementations and application of the innovations described herein are defined by the appended claims.

SUMMARY

In one aspect, a system for shifting a transmission from a first gear ratio to a second gear ratio includes a first clutch associated with the first gear ratio and operating as an off-going clutch, a second clutch associated with the second gear ratio and operating as an on-coming clutch, an additional clutch operating as an assisting clutch, and a controller. The controller is configured to engage the on-coming clutch and increase an amount of torque carried by the on-coming clutch and engage the assisting clutch and increase an amount of torque carried by the assisting clutch. The controller is further configured to disengage the off-going clutch and reduce an amount of torque carried by the off-going clutch and, after disengaging the off-going clutch, disengage the assisting clutch and reduce the amount of torque carried by the assisting clutch.

In another aspect, a clutch control system for shifting a transmission from a first gear ratio to a second gear ratio includes a first clutch operating as an off-going clutch, a second clutch operating as an on-coming clutch, an additional clutch operating as an assisting clutch, and a controller. The controller is configured to engage the on-coming clutch and increase on-coming clutch torque applied by the on-coming clutch and engage the assisting clutch and increase assisting clutch torque applied by the assisting clutch. The controller is further configured to disengage the off-going clutch and reduce off-going torque applied by the off-going clutch and, after disengaging the off-going clutch, disengage the assisting clutch and reduce the assisting clutch torque applied by the assisting clutch.

In still another aspect, a method of shifting a transmission from a first gear ratio to a second gear ratio includes engaging a clutch associated with the second gear ratio and operating as an on-coming clutch to increase on-coming clutch torque carried by the on-coming clutch and engaging an additional clutch operating as an assisting clutch to increase assisting clutch torque carried by the assisting clutch. The method further includes disengaging another clutch associated with the first gear ratio and operating as an off-going clutch to reduce off-going clutch torque carried by the off-going clutch and disengaging the assisting clutch after disengaging the off-going clutch to reduce the assisting clutch torque carried by the assisting clutch.

BRIEF DESCRIPTION OF THE DRAWINGS

FIG. 5 is an exemplary performance graph illustrating actual pressure during a shifting operation similar to that of FIG. 4 in accordance with the disclosure; and FIG. 6 is an exemplary performance graph illustrating clutch torque during a shifting operation similar to that of FIG. 4 in accordance with the disclosure.

DETAILED DESCRIPTION

Figure 1:
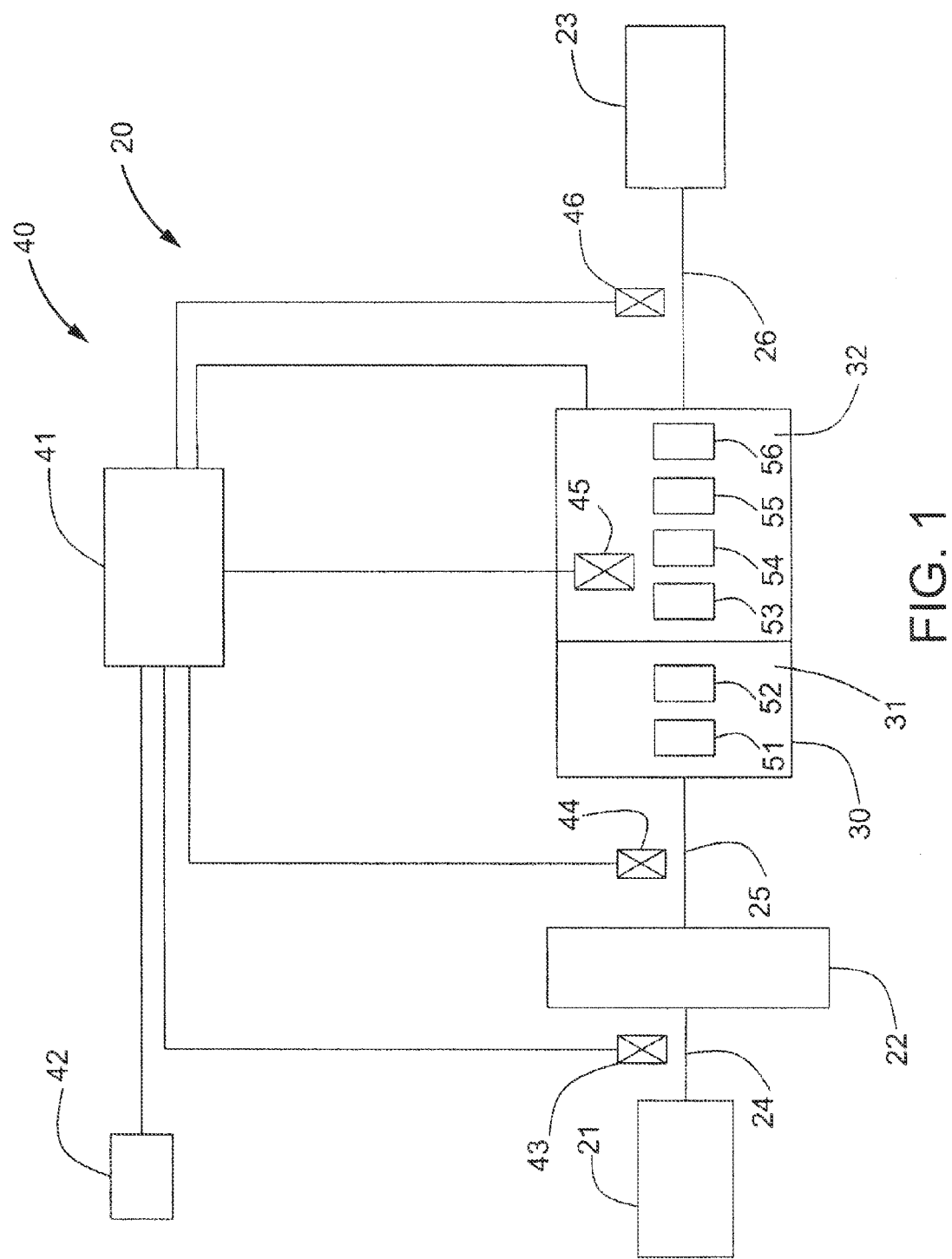
FIG. 1 is a schematic illustration of a power train in accordance with the disclosure.

FIG. 1 depicts a power train 20 of a machine (not shown) that includes a prime mover such as an internal combustion engine 21, a torque converter 22, a multi-speed transmission 30, and a drive train 23. The internal combustion engine 21 is connected to the torque converter 22 via rotatable shaft 24, the torque converter 22 is connected to the transmission 30 via rotatable input shaft 25, and the transmission 30 is connected to the drive train 23 via rotatable output shaft 26.

Transmission 30 includes a plurality of gears (not shown) that may be engaged in various combinations to achieve desired gear ratios between input shaft 25 and output shaft 26. In addition, the gears control the direction of rotation of output shaft 26 to establish forward and reverse movement of the machine. A plurality of clutches are located within the transmission. Although six clutches 51-56 are depicted, transmission 30 may include other numbers of clutches as desired. Gear shifts are accomplished by selectively engaging and disengaging combinations of the clutches. The clutches may be actuated by various means such as hydraulic pressure, an eddy-current brake, an electro-magnet, or a ball-screw actuator and may be controlled by a control system indicated generally at 40.

The control system 40 may include one or more input devices 42 to select a desired gear ratio and direction. A controller 41 may receive the gear selection signal and control the operation of the hydraulic system that engages and disengages the clutches. The controller 41 may also receive various other input signals representative of various operating parameters. Such other inputs signals may include an engine speed signal from an engine speed sensor 43, a transmission input speed signal from a transmission input speed sensor 44, one or more internal transmission speed signals from one or more internal transmission speed sensors 45, a transmission input torque determined or estimated based upon operating parameters of the internal combustion engine 21 and/or other information, and a transmission output speed signal from a transmission output speed sensor 46.

The controller 41 may be any type of controller including electronic, hydraulic, or electro-hydraulic and further may be a single controller or may include more than one controller disposed to control various functions and/or features of the machine as well as the transmission 30. As used herein, the term "controller" is meant to include one or more controllers that may be associated with the transmission 30 and that may cooperate in controlling various functions and operations of the transmission.

In one embodiment, controller 41 may be an electronic controller that operates in a logical fashion to perform operations, execute control algorithms, store and retrieve data and other desired operations. The controller 41 may include or access memory, secondary storage devices, processors, and any other components for running an application. The memory and secondary storage devices may be in the form of read-only memory (ROM) or random access memory (RAM) or integrated circuitry that is accessible by the controller 41. Various other circuits may be associated with the controller 41 such as power supply circuitry, signal conditioning circuitry, driver circuitry, and other types of circuitry. The functionality of the controller 41 may be implemented in hardware and/or software without regard to the functionality. One or more data maps relating to the operating conditions of the transmission 30 may be stored in the memory of controller 41. Each of these data maps may include a collection of data in the form of tables, graphs, and/or equations.

In another embodiment, the controller 41 may be hydraulic or electro-hydraulic. For example, the controller 41 may operate by adjusting valves such as spool valves (not shown) to change the pressure within lines of a hydraulic system of the transmission. The transmission 30 may be configured so that the changing pressure results in the engagement and disengagement of the gears.

Figure 2:
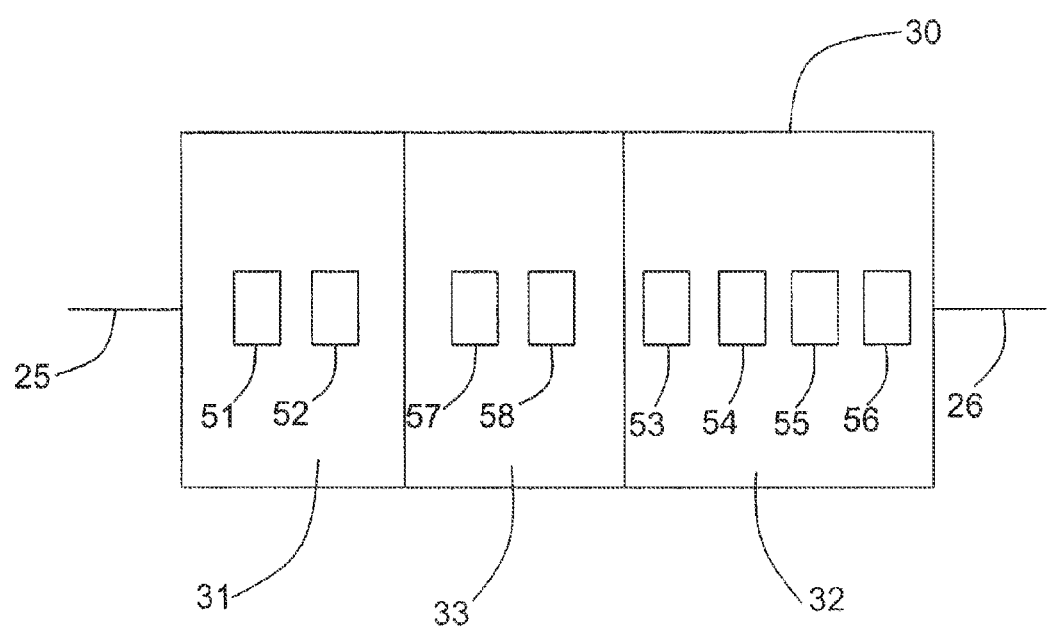
FIG. 2 is a schematic illustration of an alternate embodiment of a transmission in accordance with the disclosure.

The transmission 30 may be configured in a number of different manners. In one configuration depicted in FIG. 1, transmission 30 includes a front section 31 operatively connected to input shaft 25 and a rear section 32 operatively connected to output shaft 26. In such configuration, a first set of clutches, such as clutches 51-52, is located in the front section 31 and may operate as a first directional clutch and a second directional clutch for shifting between a first direction (e.g., forward) and a second opposite direction (e.g., reverse). A second set of clutches, such as clutches 53-56, is located in rear section 32 and may operate as speed clutches for shifting between different gear ratios. Other configurations of transmissions are contemplated. For example, an intermediate section 33 (FIG. 2) may be provided between front section 31 and rear section 32. Intermediate section 33 may include an additional set of intermediate clutches 57-58 that operates to provide additional functionality within transmission 30. The intermediate clutches may form an additional set of clutches or may be a portion of the first set or a portion of the second set of clutches. Each of the sections of the transmissions may include other numbers of clutches as necessary for carrying out desired shifting operations.

When engaging or applying clutches to shift gears in a speed shifting operation, it is often desirable to engage an on-coming clutch and an off-going clutch in a predetermined sequence to minimize any perceived interruptions in power and to avoid undesirable tie-up within the transmission 30. Such tie-up may result in undesirable energy losses during a shifting operation.

While operating the power train 20, torque is transferred from the input shaft 25, through the transmission 30, to the output shaft 26. Within the transmission, torque is transmitted through each of the clutches that are in an engaged configuration. Different clutches may be engaged depending on the desired gear ratio. The operative gear ratio of the transmission 30 may be changed by shifting the gears within the transmission. Such a change in or shifting of gears is often referred to as speed shifting and may operate as an upshift in which the gear ratio is reduced or a downshift in which the gear ratio is increased. To perform a speed shifting operation, clutches are used to change the engagement of various gears.

Figure 3:
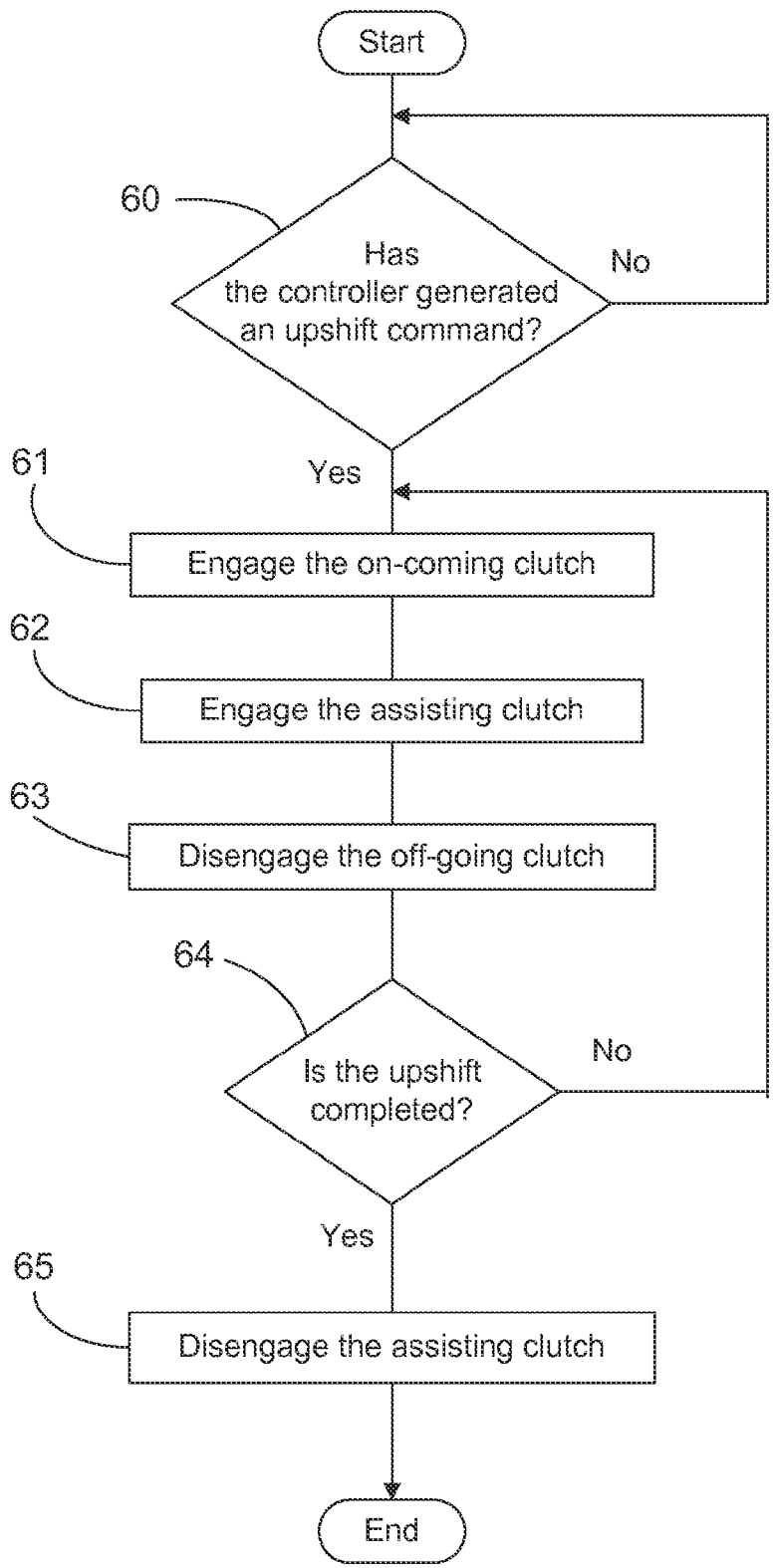
FIG. 3 is a flow chart illustrating a process in accordance with the disclosure.

Referring to FIG. 3, a flow chart is depicted of an exemplary upshift operation for shifting between a first gear ratio and a second gear ratio. During such operation, a first speed clutch (such as clutch 53 in FIG. 1) is engaged while the transmission 30 is operating at the first gear ratio. A second speed clutch (such as clutch 54 in FIG. 1) will be engaged while the transmission is operating at the second gear ratio. At decision stage 60, the controller 41 may determine whether an upshift of the transmission 30 should occur from the first gear ratio to the second gear ratio by comparing the data map of the controller to the operating conditions of the power train 20 (e.g., the engine speed, transmission input speed, speeds of internal transmission components, transmission output speed) as well as any input from an operator such as from input device 42. Once the controller 41 determines that an upshift operation should occur, at stage 61, the controller 41 engages at a predetermined rate or in a predetermined manner the second speed clutch (such as clutch 54) that operates as an on-coming clutch. The engagement of the on-coming clutch increases the torque carried by the on-coming clutch according to a predetermined profile.

At stage 62, the controller 41 engages at a predetermined rate or in a predetermined manner an additional clutch that operates as an assisting clutch. In one embodiment, the additional clutch may be a third speed clutch (such as clutch 55 in FIG. 1) that is not used by the transmission for either the first gear ratio or the second gear ratio. In another embodiment such as one in which transmission 30 includes multiple speed directional clutches (e.g., multiple forward clutches), the additional clutch may be an unused directional clutch. The engagement of the assisting clutch increases the torque carried by the assisting clutch. In one embodiment, the torque carried by the assisting clutch may increase in proportion to the torque carried by the on-coming clutch. Other engagement sequences (i.e., timing) and rates of increase of torque are contemplated.

At stage 63, the controller 41 disengages at a predetermined rate or in a predetermined manner the first speed clutch (such as clutch 53) that operates as the off-going clutch. The disengagement of the off-going clutch decreases the torque carried by the off-going clutch. In one embodiment, the torque carried by the off-going clutch may decrease in proportion to the torque carried by the on-coming clutch. Other engagement sequences (i.e., timing) and rates of decrease of torque are contemplated.

During stages 61-63, the torque carried by the off-going clutch is transferred to the on-coming clutch and the assisting clutch. To avoid or minimize interruptions in the transfer of torque from the input shaft 25 to the output shaft 26 of transmission 30 during the shifting operation, the torque may be shared between the off-going clutch, the on-coming clutch, and the assisting clutch as the shifting operation occurs. More specifically, the torque is initially carried by the off-going clutch at the beginning of the speed shifting process. The torque is then gradually transferred to the on-coming clutch and the assisting clutch so that torque carried by the off-going clutch is gradually reduced and the torque carried by the on-coming clutch and the assisting clutch is gradually increased while the torque carried by the off-going clutch is reduced to zero. As a result, during the upshifting process, the off-going clutch, the on-coming clutch, and the assisting clutch share, to some extent, the torque from the prime mover.

At decision stage 64, the controller 41 determines whether the upshift has been completed. If the upshift has not been completed, stages 61-63 are repeated. If the upshift has been completed, the controller 41 disengages at stage 65 the assisting clutch. The disengagement of the assisting clutch decreases the torque carried by the assisting clutch so that all of the torque between the input shaft 25 and the output shaft 26 is carried by the second speed clutch (that was operating as the on-coming clutch) while the transmission 30 is operating in the second gear ratio.

As described in further detail below, many alternatives to the timing of the steps of the process of FIG. 3 are contemplated. For example, the extent, rate, and timing at which the on-coming clutch and the assisting clutch are engaged may depend upon numerous factors. Still further, the timing and rate at which the off-going clutch and the assisting clutch are disengaged may also depend upon numerous factors.

When performing the various stages described above, in an example of an electronic or electro-hydraulic controller 41, the controller may transmit electrical signals that result in the engagement and disengagement of the various clutches. In an example in which the controller 41 is hydraulic or electro-hydraulic, the engagement and disengagement of the various clutches may be effected by increases and/or decreases in hydraulic pressure through the use of hydraulic signals. In any case, regardless of the manner of operation of the controller 41, the controller commands the operation of the transmission to control the shifting as desired.

Figure 4:
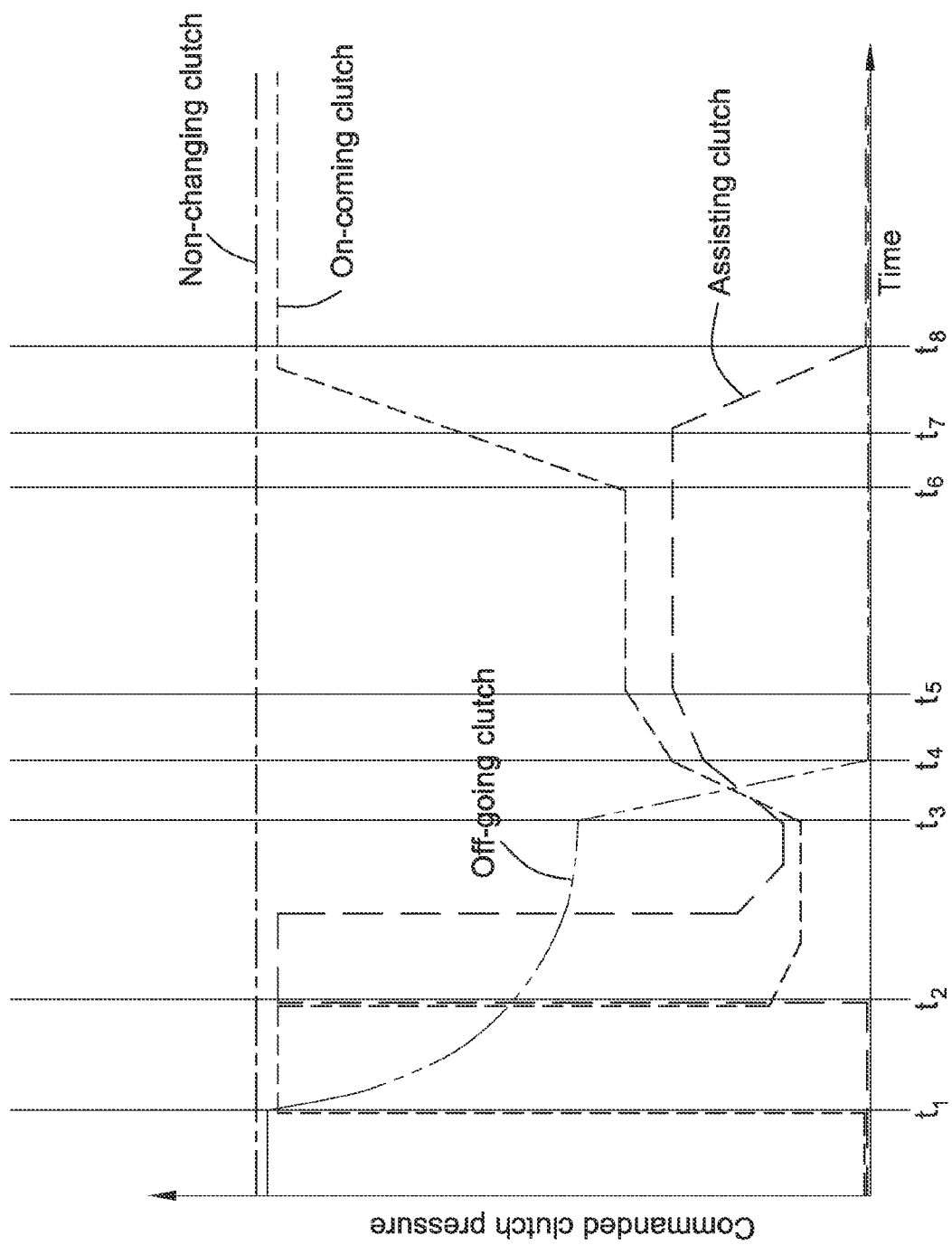
FIG. 4 is an exemplary performance graph illustrating commanded pressure during a shifting operation in accordance with the disclosure.

Referring to FIG. 4, examples of the pressure of each of the off-going, on-coming, and assisting clutches as commanded by controller 41 during an upshifting operation are depicted. At a first designated trigger event $t_1$, the controller 41 may command a reduction in pressure to the off-going clutch (such as clutch 53) until a further reduction in pressure will result in slippage of the off-going clutch.

At the first designated trigger event $t_1$, the controller may also command an increase in pressure to the on-coming clutch (such as clutch 54) to fill the hydraulic circuitry associated with the on-coming clutch. Once the hydraulic circuitry associated with the on-coming clutch is filled, the controller 41 may reduce the commanded pressure. Similarly, at the second designated trigger event $t_2$, the controller 41 may command an increase in pressure to the assisting clutch (such as clutch 55) to fill the hydraulic circuitry associated with the assisting clutch. Once the hydraulic circuitry associated with the assisting clutch is filled, the controller 41 may reduce the pressure commanded.

It should be noted that although the controller 41 commanded a decrease in pressure to the off-going clutch and an increase in pressure to the on-coming clutch at first designated trigger event $t_1$ and an increase in pressure to the assisting clutch at second designated trigger event $t_2$, the decrease and increases in pressure may also occur approximately simultaneously, or may be staggered and occur in any order.

At the third designated trigger event $t_3$, the controller 41 may generate a command to decrease the pressure to the off-going clutch and increase the pressure to each of the on-coming clutch and the assisting clutch. As a result, the torque between the input shaft 25 and the output shaft 26 is gradually transferred from the off-going clutch to the on-coming clutch and the assisting clutch. Upon reaching the fourth designated trigger event $t_4$, the commanded pressure of the off-going clutch may be zero. At the fourth designated trigger event $t_4$, the controller 41 may generate commands to continue to increase the pressure to each of the on-coming clutch and the assisting clutch. It should be noted that the commanded rate of increase in pressure (i.e., the slope in FIG. 4) may decrease while the actual pressure at each of the on-coming clutch and the assisting clutch increases at a constant rate since the pressure to the off-going clutch has been reduced to zero.

At the fifth designated trigger event $t_5$, the commanded pressure at the on-coming clutch and the assisting clutch may be maintained at approximately constant levels. The pressure may be maintained at the on-coming clutch and the assisting clutch until the on-coming clutch is no longer slipping.

At the sixth designated trigger event $t_6$, the controller 41 may generate a command to increase the pressure to the on-coming clutch to a relatively high level or value. This permits an increase in input torque while reducing the likelihood of slippage of the on-coming clutch. At the seventh designated trigger event $t_7$, the controller 41 may generate a command to decrease the pressure to the assisting clutch. Although the seventh designated trigger event $t_7$ is depicted in FIG. 4 as occurring after the sixth designated trigger event $t_6$, the sixth and seventh designated trigger events may occur approximately simultaneously as depicted in FIGS. 5-6.

Upon reaching the sixth designated trigger event $t_6$, the on-coming clutch is no longer slipping and the shift has effectively been completed. As such, the engagement by the assisting clutch decreases the efficiency of the operation of the transmission 30. However, since the assisting clutch provides additional torque that is necessary to complete the shift, it may be desirable to ensure that the on-coming clutch is no longer slipping before the pressure to the assisting clutch is reduced. Upon reaching the eighth designated trigger event $t_8$, the commanded pressure at the assisting clutch may be zero.

Referring to FIG. 5, examples of the actual pressure of each of the on-coming clutch, the assisting clutch, and the off-going clutch during the upshifting operation is depicted. At the first designated trigger event $t_1$, the pressure at the on-coming clutch is increased slightly and then may remain constant until reaching the third designated trigger event $t_3$. At the second designated trigger event $t_2$, the pressure at the assisting clutch may be increased slightly and then may remain constant until reaching the third designated trigger event $t_3$. In addition, until reaching the third designated trigger event $t_3$, the pressure at the off-going clutch remains constant.

At the third designated trigger event $t_3$, the pressure at the on-coming clutch and the assisting clutch are both increased until reaching a relatively high level at the fifth designated trigger event $t_5$. As stated above, the pressure may be increased approximately simultaneously, or in a staggered manner and occur in any order. At the third designated trigger event $t_3$, the pressure at the off-going clutch may be reduced and reaches zero at the fourth designated trigger event $t_4$. After the fifth designated trigger event $t_5$, the pressure at the on-coming clutch remains constant even after the shift is completed. The pressure at the assisting clutch remains constant until the sixth designated trigger event $t_6$ at which point the pressure to the assisting clutch is reduced. The pressure to the assisting clutch is reduced until reaching the eighth designated trigger event $t_8$.

Referring to FIG. 6, examples of the torque of each of the clutches during the upshifting operation is depicted. The torque at each of the off-going clutch, the on-coming clutch, and the assisting clutch remain constant until the third designated trigger event $t_3$. At the third designated trigger event $t_3$, the off-going clutch torque at the off-going clutch is reduced and reaches zero at the fourth designated trigger event. At the third designated trigger event $t_3$, the on-coming clutch torque at the on-coming clutch is generally increased until reaching a maximum level at the fifth designated trigger event $t_5$. At the third designated trigger event $t_3$, the assisting torque at the assisting clutch may also be generally increased until reaching a maximum level at the fifth designated trigger event $t_5$. As the torque carried by the off-going clutch decreases, the torque carried by each of the on-coming clutch and the assisting clutch increases.

After the fifth designated trigger event $t_5$, the torque at the on-coming clutch remains constant until the sixth designated trigger event $t_6$ and the shift is completed. At the sixth designated trigger event $t_6$, the torque carried by the assisting clutch may remain constant while the torque carried by the on-coming clutch may decrease as depicted at 70 due to the transition from dynamic friction to static friction as the on-coming clutch stops slipping. As the pressure to the assisting clutch is decreased after the designated trigger event $t_6$, the torque carried by the assisting clutch also decreases as depicted at 71. The torque on the on-coming clutch then increases as depicted at 72 in an amount equal to the decrease in the torque on the assisting clutch. At the eighth designated trigger event $t_8$, the torque on the assisting clutch has been reduced to zero and all of the torque has been transferred to the on-coming clutch. Accordingly, the torque on the on-coming clutch remains constant thereafter for a given input torque.

It should be noted that while a transmission 30 is operating in a steady state condition (i.e., without shifting, accelerating or decelerating), an operatively engaged clutch carries torque (i.e., steady state torque) between the input shaft 25 and the output shaft 26 of the transmission as depicted at 73 in FIG. 6. During an upshifting operation, additional torque or inertia torque must be carried due to the inertia of rotating components associated with the transmission. The combined torque that must be carried during the upshifting operation is referred to herein as the total torque or the shifting torque and equals the steady state torque plus the inertia torque. The on-coming clutch in a conventional transmission must be sized to compensate for the increase in torque that occurs during the upshifting operation. In addition, the torque carrying capacity of the on-coming clutch is typically reduced during a portion of the shifting process because of a difference between the dynamic coefficient of friction while the clutch is slipping and the static coefficient of friction while the clutch is not slipping. Accordingly, the capacity of a conventional on-coming clutch must be further increased to compensate for the reduction in capacity while the clutch is slipping. Thus, the inertia torque and slippage during upshifting may result in the necessity of the on-coming clutch being configured to have a substantially greater capacity than that required during steady state operation.

With the system disclosed herein, the on-coming torque may be shared between the on-coming clutch and the assisting clutch during the upshifting operation. Referring to FIG. 6, the torque carried by the on-coming clutch may be insufficient to complete the shift. The torque carried by the assisting clutch supplements that of the on-coming clutch. The total torque carrying capacity of the two clutches is depicted by line 74 in FIG. 6. The difference 75 between the maximum value of the shifting torque 74 required for the upshifting process and the steady state torque 73 is due to inertia effects caused by shifting. By sharing the torque during the upshifting process, the size and capacity of the on-coming clutch may be reduced and set for the maximum amount of torque that the clutch will carry after a shift has been completed (i.e., the steady state torque). In other words, the additional capacity required to complete the shift may be provided or supplied by the assisting clutch and the on-coming clutch may sized to carry only the amount of torque required after the shifting operation is completed.

FIG. 6 also depicts the change in torque carrying capacity of the on-coming clutch once the on-coming clutch stops slipping. The total torque carrying capacity is identical to the shifting torque carried by the on-coming clutch and the assisting clutch except between the sixth designated trigger event $t_6$ and the eighth designated trigger event $t_8$. As depicted at 76, the total torque carry capacity increases once the on-coming clutch stops slipping at the sixth designated trigger event $t_6$. The total torque carry capacity then decreases as depicted at 77 as the torque carried by the assisting clutch is reduced.

Many alternatives to the timing of the steps of the process depicted in the drawings are contemplated. For example, although the controller 41 commanded (as depicted in FIG. 4) a decrease in pressure to the off-going clutch, an increase in pressure to the on-coming clutch at first designated trigger event $t_1$, and an increase in pressure to the assisting clutch at second designated trigger event $t_2$, the decrease and increases in pressure may also occur simultaneously, or may be staggered and occur in any order. Still further, in some circumstances, it may be desirable for the on-coming clutch and the assisting clutch to be engaged sequentially and in any order to thus increase the pressure and torque sequentially. In still another example, the commanded pressure to the on-coming clutch may be increased at the same time the commanded pressure to the assisting clutch is decreased as opposed to the sequential operation depicted in FIG. 4.

In addition, alternatives to the clutch pressures depicted in the drawings are also contemplated. For example, the rate of change (i.e., the slopes as depicted in the drawings) of the pressures of the various clutches may vary from those depicted. In addition, clutch pressures that are depicted as being constant (e.g., the on-coming clutch and the assisting clutch pressures between fifth designated trigger event $t_5$ and sixth designated trigger event $t_6$) may change over time, if desired.

The timing of the designated trigger events as well as the rates of change of the pressures of the various clutches may be set or determined in a number of different ways. In one example, some aspects of the operation may be based upon real-time monitoring of the operation of the machine. For example, the timing of the designated trigger events and the rates of change of the clutch pressures may be set based upon monitoring of various sensors associated with the power train 20 and any input from an operator. The designated trigger events and the rates of change of each clutch pressure may be determined from a data map contained within or accessible by the controller 41 based upon data from the sensors indicative of the power train operating conditions and any input from an operator. If desired, the data map may designate the rate of change or slope of the pressure of each of the clutches. For example, the rate of increase in pressure of each of the on-coming and assisting clutches and the rate of decrease in pressure of the off-going clutch may be based upon the velocity and operating conditions of the machine as well as the current and target gear ratios. In another example, the rate of change or slope of the pressures may be set so as to be constant regardless of the velocity and operating conditions.

It should be noted that the speed clutch operated as the off-going clutch and the speed clutch operated as the on-coming clutch will be based upon the desired gear ratios of the transmission 30. However, only certain of the clutches not used in either the first or the second gear ratio can function as an assisting clutch. Applying an assisting clutch will reduce the torque carried by the on-coming clutch. In some situations, more than one additional clutch may operate as assisting clutches to share the on-coming torque during an upshifting operation. In other circumstances, no clutches may be available to operate as the assisting clutch. In still additional situations, other clutches such as an unused additional directional clutch may be used as the additional clutch.

Although the speed shifting operation is described herein in connection with an upshifting operation, the concepts disclosed herein may also be used in connection with a downshifting operation.

Still further, the concept of using an additional clutch as disclosed herein to compensate or carry inertia torque associated with any type of shifting operation and with any type of transmission. For example, the concepts disclosed herein may also be used to manage the inertia torque within the transmission in connection with directional or shuttle shifts and with shifts into gear or out of neutral. In other words, during any type of shifting operation, additional torque in the form of inertia torque may be carried by a combination of clutches until completion of the shifting operation at which point the assisting clutch may be disengaged. Still further, the on-coming and off-going clutches may not always be speed clutches.

One advantage of using an assisting clutch to share the on-coming torque during a shifting operation is that the on-coming torque is shared between the on-coming clutch and the assisting clutch. As a result, the size and torque-carrying capacity of the on-coming clutch may be reduced and set for the maximum amount of torque that the clutch will carry after the shift has been completed (i.e., the steady state torque). This may result in the ability to use one or more clutches that are smaller, lighter, and/or less expensive as compared to those of a conventional system.

Another advantage of using an assisting clutch is that the wear caused in executing a shifting operation may be distributed or allocated between the on-coming and assisting clutches in any manner desired. As a result, the wear on any one clutch may be reduced. In some systems, it may be desirable for each clutch to undergo approximately equal amounts of wear and thus distribute wear approximately evenly between the on-coming clutch and the assisting clutch. For clutches having equal diameters and equal numbers of wear elements made of the same material, the wear may be evenly distributed or shared by applying equal forces through each clutch. However, the clutches within the transmission 30 often have different diameters and different numbers of wear elements and thus different amounts of surface area. For clutches made of the same material and having different surface areas, different forces must be applied through each of the on-coming clutch and the assisting clutch to evenly distribute wear. Accordingly, the pressure directed to the on-coming clutch and the assisting braking clutch will often be different, as may be seen in FIGS. 4-5. In one example, the first on-coming clutch and the assisting clutch may undergo approximately equal amounts of wear.

Temperature rise of the friction material within a clutch may be used to measure wear distribution. Temperature rise is often proportional to the wear of a clutch. As a result, during a particular operation, the wear of a clutch may be monitored by monitoring the rise in temperature of the clutch. Many of the friction materials typically used with clutches tend to wear at substantially greater rates above a predetermined temperature for each material. Accordingly, in some configurations, it may be desirable to not only monitor the temperature rise within each clutch but to also avoid allowing the temperature of each clutch to rise above the predetermined value. Thus, the controller 41 may be set so that the pressure associated with each of the on-coming clutch and the assisting clutch results in the on-coming clutch and the assisting clutch each undergoing approximately equal rises in temperature.

The energy absorbed or dissipated per unit area of a clutch also provides a convenient means of approximating the temperature rise in a clutch. Consequently, another manner of allocating wear between the on-coming clutch and the assisting clutch is to set the energy absorbed per unit area of each clutch as approximately equal. This may be accomplished by calculating the areas of each of the on-coming clutch and the assisting clutch and applying a different force through each of the clutches. If desired, the amount of energy to be absorbed may be set so as to be maintained below a predetermined threshold. This threshold may be based upon the material from which the wear elements of the clutches is formed.

In some situations, it may be desirable to allocate wear between the on-coming clutch and the assisting clutch in an unequal manner. As an example, if one clutch is anticipated to be used less than others for shifting gears during the life of the transmission, it may be desirable for that clutch to undergo more wear than others during the various braking processes. In one example, the energy could be shared equally between clutches during shifting but with the "lesser used" clutch used more frequently as the assisting clutch as compared to other clutches. In another example, a greater force could be applied through the "lesser used" clutch which would result in it experiencing greater wear during the shifting process as compared to other clutches. In both cases, the overall wear on the "lesser used" clutch due to the shifting process would be greater as compared to other clutches. As a result, wear on the other clutches due to the shifting process may be reduced and the balancing of wear between the clutches could be used to extend the overall life of the transmission 30. In another example, the first on-coming clutch and the assisting clutch may undergo unequal amounts of wear. In still another example, the on-coming clutch and the assisting braking clutch may undergo unequal rises in temperature. In such case, it may be desirable for the temperature of each clutch to be maintained below a predetermined temperature.

Industrial Applicability

The industrial applicability of the system described herein will be readily appreciated from the foregoing discussion. The present disclosure is applicable to shifting of a transmission 30. During an upshifting operation, the on-coming torque is greater than that which will be carried after the shift due to the inertia of rotating components. The system disclosed herein shares the on-coming torque between the on-coming clutch and the assisting clutch. As a result, the size and capacity of the on-coming clutch may be reduced and set for the maximum amount of torque that the clutch will carry after an upshift has been completed. This configuration may permit a reduction in size, weight, and/or cost of one or more clutches as well as the entire transmission 30.

In addition, the system may permit improved energy distribution during shifting operations. Distributing the energy absorption may reduce the wear on any one clutch and thus may extend the life of the transmission 30. The allocation of energy may be set so as to share wear between the clutches as desired. In one aspect, the energy may be distributed so that the wear is evenly shared between clutches. In another aspect, the distribution may be configured so as to share the wear in an unequal manner. In another aspect, the wear may be shared so that the energy dissipated per unit area is generally equal. In another aspect, the wear per unit area may be maintained below a predetermined threshold. In still another aspect, the clutches may undergo approximately equal rises in temperature.

It will be appreciated that the foregoing description provides examples of the disclosed system and technique. However, it is contemplated that other implementations of the disclosure may differ in detail from the foregoing examples. All references to the disclosure or examples thereof are intended to reference the particular example being discussed at that point and are not intended to imply any limitation as to the scope of the disclosure more generally. All language of distinction and disparagement with respect to certain features is intended to indicate a lack of preference for those features, but not to exclude such from the scope of the disclosure entirely unless otherwise indicated.

Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context.

Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

The invention claimed is:

1. A system for shifting a transmission from a first gear ratio to a second gear ratio, comprising:
  a first clutch associated with the first gear ratio, the first clutch operating as an off-going clutch;
  a second clutch associated with the second gear ratio, the second clutch operating as an on-coming clutch;
  an additional clutch operating as an assisting clutch; and
  a controller configured to:
    engage the on-coming clutch and increase an amount of torque carried by the on-coming clutch;
    engage the assisting clutch and increase an amount of torque carried by the assisting clutch;
    disengage the off-going clutch and reduce an amount of torque carried by the off-going clutch; and
    after disengaging the off-going clutch, disengage the assisting clutch and reduce the amount of torque carried by the assisting clutch.

2. The system of claim 1, wherein the on-coming clutch and the assisting clutch are engaged approximately simultaneously.

3. The system of claim 1, wherein the on-coming clutch and the assisting clutch are engaged in a staggered manner.

4. The system of claim 1, wherein the on-coming clutch and the assisting clutch are applied so as to absorb generally equal energy per unit area of each of the on-coming clutch and the assisting clutch.

5. The system of claim 4, wherein the energy per unit area of each of the on-coming clutch and the assisting clutch is generally maintained below a predetermined threshold.

6. The system of claim 1, wherein the on-coming clutch and the assisting clutch are applied so that the on-coming clutch and the assisting clutch undergo approximately equal rises in temperature.

7. The system of claim 1, wherein the on-coming clutch and the assisting clutch are applied so that the on-coming clutch and the assisting clutch undergo approximately equal amounts of wear.

8. The system of claim 1, wherein the on-coming clutch and the assisting clutch are applied so as to absorb generally unequal energy per unit area of each of the on-coming clutch and the assisting clutch.

9. The system of claim 8, wherein the energy per unit area of each of the on-coming clutch and the assisting clutch is generally maintained below a predetermined threshold.

10. The system of claim 1, wherein the on-coming clutch and the assisting clutch are applied so that the on-coming clutch and the assisting clutch undergo unequal rises in temperature.

11. The system of claim 1, wherein the on-coming clutch and the assisting clutch are applied so that the on-coming clutch and the assisting clutch undergo unequal amounts of wear.

12. The system of claim 1, wherein the transmission carries a steady state torque after an upshifting operation and a shifting torque during the upshifting operation, the shifting torque being greater than the steady state torque, and the on-coming clutch is configured to carry at least the steady state torque but less than the shifting torque.

13. A clutch control system for shifting a transmission from a first gear ratio to a second gear ratio, the transmission including a first clutch operating as an off-going clutch, a second clutch operating as an on-coming clutch, and an additional clutch operating as an assisting clutch, comprising:
a controller configured to:
engage the on-coming clutch and increase on-coming clutch torque applied by the on-coming clutch;
engage the assisting clutch and increase assisting clutch torque applied by the assisting clutch;
disengage the off-going clutch and reduce off-going torque applied by the off-going clutch; and
after disengaging the off-going clutch, disengage the assisting clutch and reduce the assisting clutch torque applied by the assisting clutch.

14. The clutch control system of claim 13 wherein the on-coming clutch and the assisting clutch are engaged approximately simultaneously.

15. The clutch control system of claim 13, wherein the on-coming clutch and the assisting clutch are engaged in a staggered manner.

16. The clutch control system of claim 13, wherein the on-coming clutch carries a greater amount of torque than the assisting clutch.

17. A method of shifting a transmission from a first gear ratio to a second gear ratio, comprising:
engaging a clutch associated with the second gear ratio and operating as an on-coming clutch to increase on-coming clutch torque carried by the on-coming clutch;
engaging an additional clutch operating as an assisting clutch to increase assisting clutch torque carried by the assisting clutch;
disengaging another clutch associated with the first gear ratio and operating as an off-going clutch to reduce off-going clutch torque carried by the off-going clutch; and
disengaging the assisting clutch after disengaging the off-going clutch to reduce the assisting clutch torque carried by the assisting clutch.

18. The method of claim 17, further including engaging the on-coming clutch and the assisting clutch approximately simultaneously.

19. The method of claim 17, further including engaging the on-coming clutch and the assisting clutch in a staggered manner.

20. The method of claim 17, wherein the on-coming clutch carries a greater amount of torque than the assisting clutch.

* * * * *